US006660338B1

(12) United States Patent
Hargreaves

(10) Patent No.: US 6,660,338 B1
(45) Date of Patent: Dec. 9, 2003

(54) FUNCTIONALIZATION OF SUBSTRATE SURFACES WITH SILANE MIXTURES

(75) Inventor: John S. Hargreaves, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/802,653

(22) Filed: Mar. 8, 2001

(51) Int. Cl.⁷ .............................. B05D 5/00; B05D 3/00; C09D 1/00; C12Q 1/68; C12P 19/34
(52) U.S. Cl. ...................... 427/399; 427/299; 427/337; 427/402; 106/287.13; 106/287.14; 106/287.15; 106/287.16; 435/6; 435/91.1
(58) Field of Search ................. 428/428, 429, 428/446, 447, 448; 427/299, 337, 402, 399; 528/10, 25, 28, 33, 42; 106/287.13, 287.14, 287.15, 287.16; 435/6, 91.1

(56) References Cited

U.S. PATENT DOCUMENTS

| 4,539,061 A | 9/1985 | Sagiv .................... 156/278 |
| 5,137,765 A | 8/1992 | Farnsworth ................ 428/64 |
| 5,266,222 A | 11/1993 | Willis et al. ........... 252/49.006 |
| 5,474,796 A | 12/1995 | Brennan .................... 427/2.13 |
| 5,510,481 A | 4/1996 | Bednarski et al. ......... 536/120 |
| 5,624,711 A | 4/1997 | Sundberg et al. .......... 427/261 |
| 5,716,705 A | 2/1998 | Wirth et al. .............. 428/391 |
| 5,985,551 A | 11/1999 | Brennan ....................... 435/6 |
| 6,159,695 A * | 12/2000 | McGovern et al. ......... 427/299 |
| 6,258,454 B1 * | 7/2001 | Lefkowitz et al. .......... 428/333 |
| 6,262,216 B1 * | 7/2001 | McGall ....................... 422/50 |
| 6,444,268 B2 * | 9/2002 | Lefkowitz et al. .......... 427/337 |
| 6,528,264 B1 * | 3/2003 | Pal et al. ..................... 435/6 |

FOREIGN PATENT DOCUMENTS

WO    WO96/06895    3/1996   ......... C09D/183/08

OTHER PUBLICATIONS

Yu–Tai, T. And Dao–Yang, H. Preparation And Characterization Of Mixed Monolayer With Controllable Composition, *Bull. Inst. Chem, Academia Sinica*, 1988, vol. No. 35,23–30.

* cited by examiner

*Primary Examiner*—Robert Dawson
*Assistant Examiner*—Michael J Feely
(74) *Attorney, Agent, or Firm*—Timothy H. Joyce

(57) ABSTRACT

Low surface energy functionalized surfaces on solid supports are provided by contacting a surface of a solid substrate having reactive moieties on the surface with a solution of an organic solvent and water. The surface of the solid substrate is then contacted with a derivatizing composition containing a mixture of silanes. A first silane provides the desired reduction in surface energy, while the second silane enables functionalization with molecular moieties of interest, such as small molecules. Molecular moieties of interest may be attached through cleavable sites. Derivatizing compositions for carrying out the surface functionalization process are provided as well.

38 Claims, 4 Drawing Sheets

(A)
(B)
(C)

(A)

(B)

(C)

(B)

(A)

US 6,660,338 B1

FUNCTIONALIZATION OF SUBSTRATE SURFACES WITH SILANE MIXTURES

TECHNICAL FIELD OF THE INVENTION

The invention relates generally to chemical functionalization of surfaces to modify the properties thereof. In particular, the invention relates to improved methods of functionalization of a substrate with silane mixtures to reduce surface energy and constrain droplets of liquid that are applied to the substrate surface. A primary use of the invention is in the field of solid phase synthesis of oligomer arrays.

BACKGROUND

Functionalized solid surfaces are useful in both chemistry and biotechnology. One important application is in solid phase chemical synthesis, wherein the initial derivatization of a substrate surface allows for synthesis of polymers such as oligonucleotides and peptides on the substrate itself. In addition, support bound oligomer arrays are particularly useful for screening studies and sequence identification in complex nucleic acids. Modification of surfaces for use in chemical synthesis has already been described, for example, in U.S. Pat. No. 5,624,711 to Sundberg et al., in U.S. Pat. No. 5,266,222 to Willis et al., and in U.S. Pat. No. 5,137,765 to Farnsworth.

A number of techniques have been used for modifying siliceous or metal oxide surfaces. One of these techniques includes the derivatization of surfaces with bifunctional silanes, i.e., silanes having a first functional group that enables covalent binding to [a] the surface of interest (often a Si-halogen or Si-alkoxy group, as in —SiCl$_3$ or —Si(OCH$_3$)$_3$, respectively) and a second functional group that can impart the desired chemical and/or physical properties to the surface. However, this type of surface modification often imparts unwanted physical properties to the surface due to the presence of the second functional group. It is currently of interest to produce arrays that may use different oligonucleotides on siliceous surfaces and that have high density of features. The various features can be independently created by the planar separation of individual phosphoramidite coupling reactions as the oligonucleotides are synthesized. This can be most easily accomplished by simply spotting the phosphoramidite solutions onto the surface. Feature density can then be determined by the spread of the solution droplet deposited on the surface, which is determined by the volume of the droplet and the contact angle between the droplet and the surface. However, covalently coupling the first nucleotide phosphoramidite to the substrate surface requires hydroxyl moieties on the surface, which makes the surface wettable by the phosphoramidite solutions and thus creates droplet spread. This limits the quality of the features and the feature density that may be used.

The above mentioned problem can be overcome using a variety of techniques that are well known in the art. For instance, one solution has been to implement the use of permanent wells. Permanent wells can be formed by micromachining the substrate, with the active surfaces subsequently modified and, therefore, constraining the droplet by the capillary action.

Another method to overcome this problem involves the use of a temporary well that can be formed as a pre-formed stencil or by applying a coating to the substrate and patterning the coating. Alternatively, as described in U.S. Pat. No. 5,474,796 to Brennan, a pattern of two different surface-bound silanes can be formed by physically masking the surface, depositing a first silane, and then removing the mask and depositing a second silane. More recently, techniques have been developed using various derivatizing compositions containing different silanes under anhydrous reaction conditions to provide functionalized surfaces on substrates. As described above, the presence of water, due to addition of aqueous solutions or caused by failing to maintain anhydrous conditions, prevents from obtaining substrates with a functionalized surface and low surface energy. In array fabrication, it is desirable to produce functionalized substrate surfaces without the need to maintain completely anhydrous conditions. It is also desirable to develop techniques that may actually be conducted under aqueous conditions to produce functionalized substrates of low surface energy that are useful for construction of stable array platforms.

SUMMARY OF THE INVENTION

The invention provides a process for preparing a substrate having a functionalized surface and a low surface energy. The process comprises contacting a solid substrate having reactive moieties on the surface with a mixture of organic solvent and water, and with a derivatizing composition.

The invention provides a derivatizing composition comprising a first silane, $R^1$—Si($R^L R^X R^Y$) and a second silane, $R^2$—(L)$_n$—Si($R^L R^X R^Y$). This derivatizing composition can be used to functionalize a substrate surface that has been contacted with a mixture of organic solvent and water. The $R^L$ moieties, which may be identical or different, are leaving groups, $R^X$ and $R^Y$, which may be identical or different, are either leaving groups, like $R^L$, or are lower alkyl, $R^1$ is a chemically inert moiety that lowers the surface energy of the substrate, n is 0 to 1, L is a linking group, and $R^2$ is CH=CH$_2$. The ratio of the silanes in the derivatizing composition determines the surface energy of the functionalized substrate and the density of molecular moieties that can ultimately be bound to the surface substrate.

In another embodiment, a process is provided for preparing support-bound cleavable ligands on a substrate of low surface energy. The process involves contacting a substrate having reactive moieties on the surface thereof with a derivatizing composition comprising a first silane $R^1$—Si($R^L R^X R^Y$) and a second silane $R^2$—(L)$_n$—Si($R^L R^X R^Y$) as discussed above, under reaction conditions effective to couple the silanes to the substrate surface (i.e., the reaction can be carried out by first contacting the substrate surface with a mixture of organic solvent and water and then adding the derivatizing composition or by contacting the substrate surface with the mixture and the derivatizing composition). The functionalization provides —Si—$R^1$ groups and —Si—(L)$_n$—$R^2$ groups on the surface of the substrate. A ligand is then coupled to the surface at $R^2$, through a linking moiety containing a cleavable site. The ligand may be, for example, a small molecule, a first monomer in the solid phase synthesis of an oligomer, an intact oligomer, or the like.

In an additional embodiment, a derivatizing composition is provided for carrying out the aforementioned processes. The derivatizing composition comprises a mixture of silanes, including a first silane $R^1$—Si($R^L R^X R^Y$) and a second silane $R^2$—(L)$_n$—Si($R^L R^X R^Y$), wherein $R^1$, $R^2$, $R^L$, $R^X$, $R^Y$ and n are defined as above.

Finally, the functionalized substrates provided using the presently disclosed and claimed processes and compositions represent a further embodiment of the invention. The substrates have surface-bound —Si—R$^1$ groups and —Si—(L)$_n$—R$^2$ groups, wherein the R$^1$ moieties reduce surface energy and the R$^2$ moieties comprise either functional groups enabling covalent attachment of a molecular moiety of interest or modifiable groups that can be converted to such functional groups.

BRIEF DESCRIPTION OF THE DRAWINGS

Embodiments of the invention will now be described with reference to the drawings in which.

DETAILED DESCRIPTION OF THE INVENTION

Overview and Definitions

Figure 1:
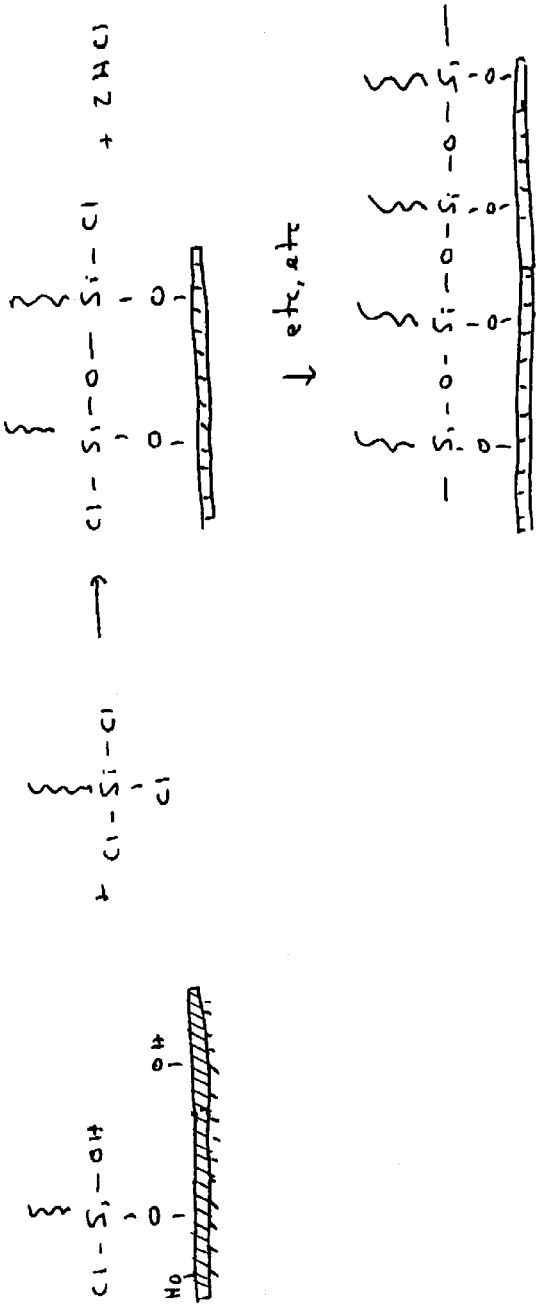
FIG. 1 illustrates a general schematic view of a first proposed mechanism of the present invention.

Before describing the present invention in detail, it is to be understood that this invention is not limited to specific compositions, reagents, process steps, or equipment, as such may vary. It is also to be understood that the terminology used herein is for the purpose of describing particular embodiments only, and is not intended to be limiting.

It must be noted that the singular forms "a", "an", and "the", as used in this specification and the appended claims, include plural referents unless the context clearly dictates otherwise. Thus, reference to "a" first silane having the structural formula R$^1$—Si(R$^L$R$^X$R$^Y$) includes mixtures of silanes having the recited structure, while, similarly a second silane having the structural formula R$^2$—(L)$_n$—Si(R$^L$R$^X$R$^Y$) includes mixtures of such silanes, "a" cleavable site includes a multiplicity of cleavable sites, and the like.

In describing and claiming the present invention, the following terminology will be used in accordance with the definitions set out below. The term "functionalization" as used herein relates to modification of a solid substrate to provide a plurality of functional groups on the substrate surface. By a "functionalized" surface as used herein is meant a substrate surface that has been modified so that a plurality of functional groups are present thereon. The terms "reactive moiety or moieties", refers to groups that can be used as the starting point in a synthetic organic process. This may include hydrophilic groups. This is in contrast to "inert" hydrophilic groups that could also be present on a substrate surface, e.g, hydrophilic sites associated with polyethylene glycol, a polyamide or the like.

The "surface energy" (measured in ergs/cm$^2$) of a liquid or solid substance pertains to the free energy of a molecule on the surface of the substance, which is necessarily higher than the free energy of a molecule contained in the interior of the substance; surface molecules have an energy roughly 25% above that of interior molecules. The term "surface tension" refers to the tensile force tending to draw surface molecules together, and although measured in different units (as the rate of increase of surface energy with area, in dynes/cm), is numerically equivalent to the corresponding surface energy. By modifying a substrate surface to "reduce" surface energy, is meant lowering the surface energy below that of the unmodified surface.

The term "monomer" refers to a chemical entity that can be covalently linked to one or more other such entities to form an oligomer. Examples of "monomers" include nucleotides, amino acids, saccharides, peptoids, and the like. In general, the monomers used in conjunction with the present invention have first and second sites (e.g., C-termini and N-termini, or 5' and 3' sites) suitable for binding to other like monomers by means of standard chemical reactions (e.g., condensation, nucleophilic displacement of a leaving group, or the like), and a diverse element which distinguishes a particular monomer from a different monomer of the same type (e.g., an amino acid side chain, a nucleotide base, etc.). The initial substrate-bound monomer is generally used as a building-block in a multi-step synthesis procedure to form a complete ligand, such as in the synthesis of oligonucleotides, oligopeptides, and the like.

The term "oligomer" is used herein to indicate a chemical entity that contains a plurality of monomers. As used herein, the terms "oligomer" and "polymer" are used interchangeably, as it is generally, although not necessarily, smaller "polymers" that are prepared using the functionalized substrates of the invention, particularly in conjunction with combinatorial chemistry techniques. Examples of oligomers and polymers include polydeoxyribonucleotides, polyribonucleotides, other polynucleotides which are B or C-glycosides of a purine or pyrimidine base, polypeptides, polysaccharides, and other chemical entities that contain repeating units of like chemical structure. In the practice of the instant invention, oligomers will generally comprise about 2–50 monomers, preferably about 2–20, more preferably about 3–10 monomers.

The term "ligand" as used herein refers to a moiety that is capable of covalently or otherwise chemically binding a compound of interest. Typically, when the present substrates are used in solid phase synthesis, they are used so that "ligands" are synthesized thereon. These solid-supported ligands can then be used in screening or separation processes, or the like, to bind a component of interest in a sample. The term "ligand" in the context of the invention may or may not be an "oligomer" as defined above. However, the term "ligand" as used herein may also refer to a compound that is not synthesized on the novel functionalized substrate, but that is pre-synthesized or obtained commercially, and then attached to the substrate.

The term "sample" as used herein relates to a material or mixture of materials, typically, although not necessarily, in fluid form, containing one or more components of interest.

The terms "nucleoside" and "nucleotide" are intended to include those moieties that contain not only the known purine and pyrimidine bases, but also other heterocyclic bases that have been modified. Such modifications include methylated purines or pyrimidines, acylated purines or pyrimidines, or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

As used herein, the term "amino acid" is intended to include not only the L-, D- and nonchiral forms of naturally occurring amino acids (alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine), but also modified amino acids, amino acid analogs, and other chemical compounds which can be incorporated in conventional oligopeptide synthesis, e.g., 4-nitrophenylalanine, isoglutamic acid, isoglutamine, ε-nicotinoyl-lysine, isonipecotic acid, tetrahydroisoquinoleic acid, α-aminoisobutyric acid, sarcosine, citrulline, cysteic acid, t-butylglycine, t-butylalanine, phenylglycine, cyclohexylalanine, β-alanine, 4-aminobutyric acid, and the like.

The terms "protection" and "de-protection" as used herein relate, respectively, to the addition and removal of chemical protecting groups using conventional materials and techniques within the skill of the art and/or described in the pertinent literature; for example, reference may be had to Greene et al., *Protective Groups in Organic Synthesis*, 2nd Ed., New York: John Wiley & Sons, 1991. Protecting groups prevent the site to which they are attached from participating in the chemical reaction to be carried out.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of 1 to 6 carbon atoms, preferably 1 to 4 carbon atoms.

The term "alkoxy" as used herein refers to a substituent —O—R wherein R is alkyl as defined above. The term "lower alkoxy" refers to such a group wherein R is lower alkyl.

The term "alkylene" as used herein refers to a difuctional saturated branched or unbranched hydrocarbon chain containing from 1 to 24 carbon atoms, and includes, for example, methylene (—$CH_2$—), ethylene (—$CH_2$—$CH_2$—), propylene (—$CH_2$—$CH_2$—$CH_2$—), 2-methylpropylene (—$CH_2$—$CH(CH_3)$—$CH_2$—), hexylene (—$(CH_2)_6$—), and the like. A "lower alkylene" refers to an alkylene group of 1 to 6, more preferably 1 to 4, carbon atoms.

The terms "alkenyl" and "olefinic" as used herein refer to a branched or unbranched hydrocarbon group of 2 to 24 carbon atoms containing at least one carbon-carbon double bond, such as ethenyl, n-propenyl, isopropenyl, n-butenyl, isobutenyl, t-butenyl, octenyl, decenyl, tetradecenyl, hexadecenyl, eicosenyl, tetracosenyl and the like.

The terms "halogen" or "halo" are used in the conventional sense to refer to a chloro, bromo, fluoro or iodo substituent.

The term "organic solvent" as used herein is used in the conventional sense to refer to a variety of substituted and non-substituted carbon based solvents. For example, the term refers to and is not limited to the use of benzene, toluene, xylenes, substituted benzyl solvents, and aromatic and non-aromatic hydrocarbon solvents. In addition, the term also includes hydrocarbon aliphatic solvents such as pentane, hexane, decane and cyclic compounds of a similar nature such as cyclohexane and cyclodecane etc.

The term "optional" or "optionally" means that the subsequently described circumstance may or may not occur, so that the description includes instances where the circumstance occurs and instances where it does not. For example, the phrase "optionally substituted" means that a non-hydrogen substituent may or may not be present, and, thus, the description includes structures wherein a non-hydrogen substituent is present and structures wherein a non-hydrogen substituent is not present.

Accordingly, the invention in a first embodiment is directed to a process for preparing a substrate with a functionalized surface and a low surface energy. The functionalized surface that is prepared using this process has functional groups enabling covalent binding of molecular moieties, such as in solid phase chemical synthesis or the like, but nevertheless has lowered surface energy. The wettability of the substrate becomes irrelevant due to the fact that aqueous solutions and water are added in the first step of the process.

The inventive process involves contacting a solid substrate having reactive moieties on the surface with a mixture of organic solvent and water and subsequently adding a derivatizing composition containing the silanes to the mixture-surface combination. The aqueous conditions are effective to couple the silanes to the surface substrate via reactive moieties present on the substrate surface (see FIGS. 1–3). The inventive process may also be performed by contacting the surface of the solid substrate, at the same time, with the mixture and the derivatizing composition of silanes. For example, the inventive process may be performed by combining the mixture of organic solvent and water with the silanes and then contacting the surface of the solid support with the resulting solution.

FIGS. 1(A–C) illustrates a first proposed mechanism of the invention. The trichloro silane mixture first reacts with a water molecule to form a monohydroxydichlorosilane and hydrochloric gas (shown in FIG. 1(A)). The monohydroxydichlorosilane then interacts with the reactive moieties such as a hydroxyl group on the substrate surface to form a bound monochlorohydroxysilane and hydrochloric gas (See FIG. 1(B)). The bound monochlorohydroxysilane then reacts with a trichlorosilane present in solution to form the extended bridged compound shown in FIG. 1(C). Two moles of hydrochloric gas are produced at this step.

Figure 2:
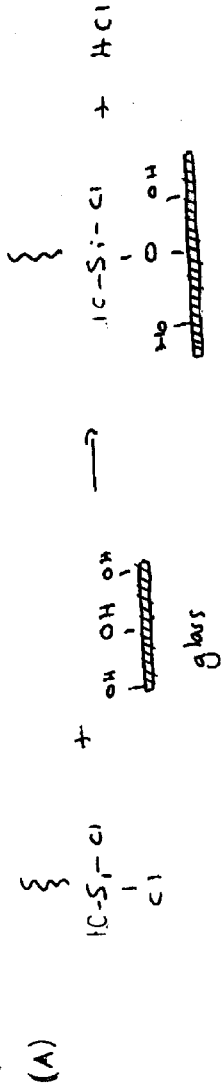
FIG. 2 illustrates a general schematic view of a second proposed mechanism of the invention.
Figure 2:
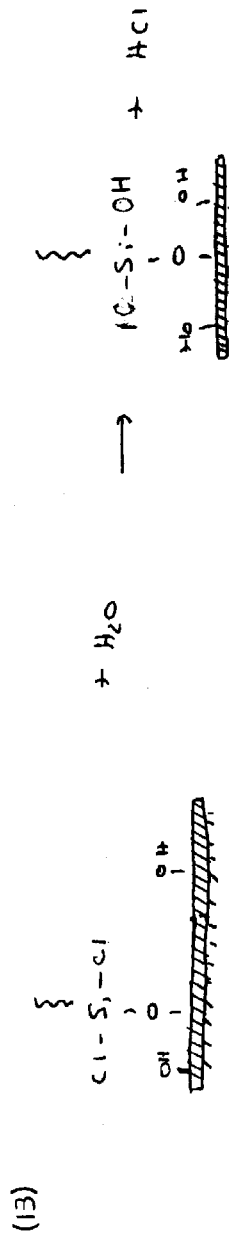
Figure 2:
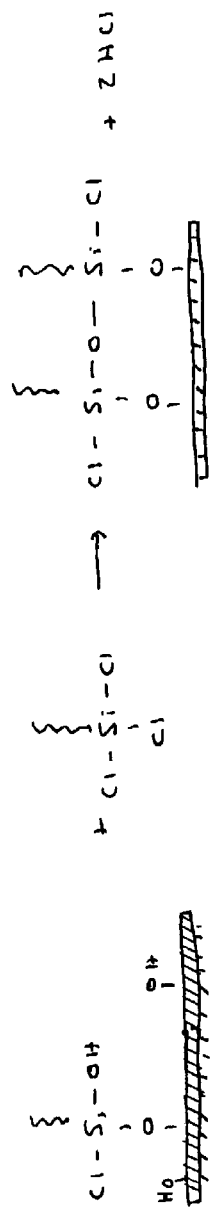
Figure 2:
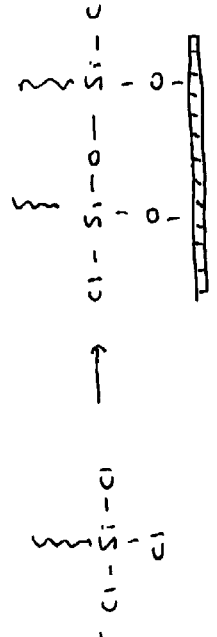
Figure 2:
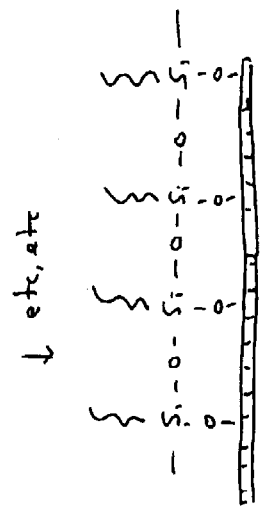

FIGS. 2(A–C) illustrates a second proposed mechanism of the invention. In this case, the trichlorosilane(s) react(s) first with the reactive moieties or hydroxyl groups on the substrate (instead of reacting with water) to form a bound dichlorosilane and hydrochloric gas (see FIG. 2(A)). The dichlorosilane compound then reacts with water to form a bound monochlorohydroxysilane and hydrochloric gas (See FIG. 2(B)). The bound monochlorohydroxysilane then reacts with the trichlorosilanes in solution to form an extended bridged compound similar to that presented in FIG. 1(C). (See FIG. 2(C)).

Figure 3:
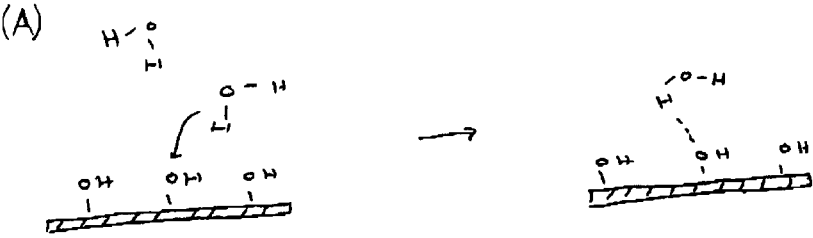
FIG. 3 illustrates a general schematic view of a third proposed mechanism of the invention.
Figure 3:
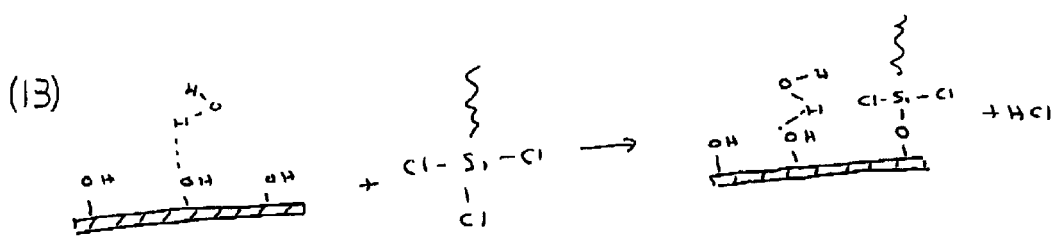
Figure 3:
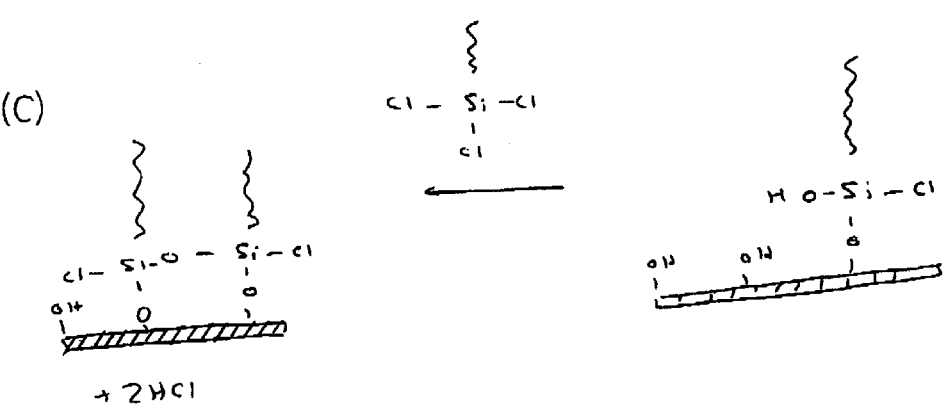
Figure 3:
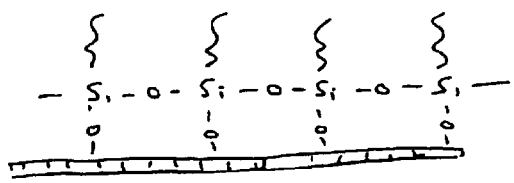

FIGS. 3(A–C) shows a third proposed mechanism of the invention. In FIG. 3(A) the water molecule(s) interact(s) directly with the surface activated substrate through hydrogen bonding. This is largely due to the dissolved water molecules being polar and partitioning from the non-polar solvent to the polar solvent. The trichlorosilanes react separately with the surface hydroxyl groups to form a bound dichlorosilane compound and hydrochloric gas. The close proximity of the water group to the bound dichlorosilane(s) allows for the formation of the monohydroxychlorosilane compound(s). This bound reactant then further reacts with the trichlorosilanes in solution to form the extended bridged compound similar to FIGS. 1(C) and 2(C) above.

The reactive moieties on the substrate surface are typically hydroxyl groups, carboxyl groups, thiol groups, and/or substituted or unsubstituted amino groups, although, preferably, the reactive moieties are hydroxyl groups. The substrate may comprise any material that has a plurality of reactive sites on its surface, or that can be treated or coated so as to have a plurality of such sites on its surface. Suitable materials include, but are not limited to, supports that are typically used for solid phase chemical synthesis, e.g., cross-linked polymeric materials (e.g., divinylbenzene styrene-based polymers), agarose (e.g., Sepharose®), dextran (e.g., Sephadex®), cellulosic polymers, polyacrylamides, silica, glass (particularly controlled pore glass, or CPG), ceramics, and the like. The supports may be obtained commercially and used as is, or they may be treated or coated prior to functionalization.

The derivatizing composition contains two types of silanes, a first silane that may be represented as $R^1$—Si($R^L R^X R^Y$) and a second silane having the formula $R^2$—$(L)_n$—Si($R^L R^X R^Y$). In these formulae, the $R^L$ moieties which may be identical or different, are leaving groups, $R^X$ and $R^Y$, which may be identical or different, are either lower alkyl or leaving groups like $R^L$, $R^1$ is a chemically inert moiety that lowers the surface energy of the substrate, n is 0 or 1, L is a linking group, and $R^2$ is either a functional group enabling covalent binding of a molecular moiety or a group that may be modified to provide such a functional group. Reaction of the substrate surface with the derivatizing composition is carried out under reaction conditions effective to couple the silanes to the surface moieties (i.e., the reaction can be carried out by first contacting the substrate surface with a mixture of organic solvent and water and then adding the derivatizing composition or by contacting the substrate surface, at the same time, with the mixture and the derivatizing composition). The functionalization provides —Si—$R^1$ groups and —Si—$(L)_n$—$R^2$ groups on the substrate surface.

More specifically, the $R^L$ moieties, which are leaving groups, are such that they enable binding of the silanes to the surface. Typically, the leaving groups are hydrolyzable so as to form a silanol linkage to surface hydroxyl groups. Examples of suitable leaving groups include, but are not limited to, halogen atoms, particularly chloro, and alkoxy moieties, particularly lower alkoxy moieties. The $R^X$ and $R^Y$ moieties are either lower alkyl, e.g., methyl, ethyl, isopropyl, n-propyl, t-butyl, or the like, or leaving groups as just described with respect to $R^L$. Thus, each type of silane will generally contain a trichlorosilyl functionality, a tri(lower)alkylsilyl functionality such as trimethoxysilyl, mixed functionalities such as diisopropylchlorosilyl, dimethylchlorosilyl, ethyldichlorosilyl, methylethylchlorosilyl, or the like.

The first silane is the derivatizing agent that reduces the substrate surface energy as desired, while the second silane provides the surface functionalization necessary for covalent attachment of an additional molecular moiety, e.g., a ligand, a monomer, an oligomer, etc. Thus, with respect to the first silane, coupling to the substrate yields surface —Si—$R^1$ groups as explained above, wherein $R^1$ is a chemically inert moiety that lowers the surface energy of the substrate. By chemically "inert" is meant that $R^1$ will not be cleaved or modified when the functionalized substrate is used for its intended purpose, e.g., in solid phase chemical synthesis, hybridization assays, or the like. Typically, $R^1$ is an alkyl group, generally, although not necessarily, containing in the range of 2 to 24 carbon atoms, preferably in the range of 10 to 18 carbon atoms. $R^1$ may also be benzyl, either unsubstituted or substituted with 1 to 5, typically 1 to 3, halogen, preferably fluoro atoms.

The second silane, upon coupling, provides surface —Si—$(L)_n$—$R^2$ groups. Of course, if $R^X$ and $R^Y$ are not leaving groups, the surface moieties provided will actually be —Si$R^X R^Y$—$(L)_n$—$R^2$, which applicants intend to encompass by the more generic representation —Si—$(L)_n$—$R^2$. $R^2$ comprises either a functional group that can bind directly to an additional molecular species of interest, or a modifiable group that can be converted to such a functional group under conditions that do not substantially affect any other chemical species that are present. That is, $R^2$ may be a functional group such as hydroxyl, carboxyl, amino, or the like, or it may be a modifiable group such as an olefinic moiety, e.g., a terminal —CH=$CH_2$ group, which can readily be converted to a reactive hydroxyl group by boration and oxidation using procedures known in the art. L represents a linker and n is 0 or 1, such that a linker may or may not be present. If a linker is present, it will generally be a $C_1$–$C_{24}$ hydrocarbylene linking group. Preferably, L is a $C_1$–$C_{24}$ alkylene, more preferably a $C_{10}$–$C_{18}$ alkylene.

The density of $R^2$ groups on the substrate surface, following reaction with the derivatizing composition, is determined by the relative proportions of the first and second silanes in the derivatizing composition. That is, a higher proportion of the second silane in the derivatizing composition will provide a greater density of $R^2$ groups, while a higher proportion of the first silane will give rise to a lower density of $R^2$ groups. Optimally, the first silane represents in the range of approximately 0.5 wt. % to 50 wt. % of the derivatization composition, preferably in the range of approximately 1.0 wt. % to 10 wt. % of the composition, while the second silane correspondingly represents in the range of approximately 50 wt. % to 99.5 wt. % of the derivatization composition, preferably in the range of approximately 90 wt. % to 99 wt. % of the composition.

Functionalized substrates prepared using the aforementioned procedures are believed to be novel and are claimed as such herein. The surface of the functionalized substrates contain both —Si—$R^1$ and Si—$(L)_n$—$R^2$ groups, present at a predetermined ratio, with the ratio determining both surface energy and density of functional groups. These substrates may be used, for example, in any of a number of known chemical and biological procedures, such as in solid phase chemical synthesis, e.g., of oligonucleotides, oligopeptides, and oligosaccharides, in the preparation of combinatorial libraries, in chemical separation procedures, in screening processes, and the like. Such procedures are in current use and will thus be known to those skilled in the art and/or described in the pertinent literature and texts. For example, synthesis of polynucleotide libraries using now conventional phosphoramidite or phosphotriester chemistry is described by Beaucage et al. (1981) *Tetrahedron Lett.* 22:1859–62, and Itakura et al. (1975) *J. Biol. Chem.* 250:4592 (1975). Houghten (1985) *Proc. Natl. Acad. Sci. USA* 82:5131–5135), describes the preparation of a combinatorial library of peptides using a modification of the Merrifield method (Merrifield (1963) *J. Am. Chem. Soc.* 85:2149–2154; Tam et al., *The Peptides* (New York: Academic Press, 1975), at pp. 185–249); and *Oligonucleotide Synthesis*, M. J. Gait, Ed. (New York: IRL Press, 1990).

For example, synthesis of support-bound oligonucleotides is normally conducted by successive addition of protected nucleotides to a growing oligonucleotide chain, wherein the terminal 5' hydroxyl group is caused to react with a deoxyribonucleoside-3'-O-(N,N-diisopropylamino) phosphoramidite protected at the 5' position with dimethoxytrityl or the like, the 5' protecting group is removed after the coupling reaction, and the procedure is repeated with additional protected nucleotides until synthesis of the desired oligonucleotide is complete.

Additionally, and as will be appreciated by those skilled in the art, oligopeptide synthesis on a support—as may be carried out herein by virtue of the support-bound $R^2$ substituent—involves sequential addition of carboxyl-protected amino acids to a growing peptide chain, with each additional amino acid in the sequence similarly protected and coupled to the terminal amino acid of the oligopeptide under conditions suitable for forming an amide linkage. After oligopeptide synthesis is complete, acid is used to remove the remaining terminal protecting groups. The support-bound oligopeptides thus provided can then be used in any number of ways, e.g., in screening procedures involved in combinatorial processes, in chromatographic methods, and the like.

In an alternative embodiment, the method and reagents of the invention are used to provide oligomers bound to the support via a chemically cleavable site. That is, in this alternative process, following reaction of the substrate surface with the first and second silanes, a further reaction is conducted at $R^2$. This reaction involves reaction of $R^2$ with a linking group containing a cleavable site, such as an ester group, and the free terminus of the bound linking group is then used for solid phase synthesis. Conversion of $R^2$ to a different moiety may or may not be desired prior to attaching the linking group. For example, $R^2$ may be an alkylamino substituent, in which case the amino moiety serves as the reactive site for binding the linking group, or $R^2$ may be bromo, in which case it is desirable to convert $R^2$ to a primary or secondary amino substituent, and then carry out the reaction to the linking group. In this way, the bound ligand, monomer, oligomer, or the like may be cleaved from the solid support by treatment of the surface with an appropriate reagent.

Suitable cleavable sites include, but are not limited to, the following: base-cleavable sites such as esters, particularly succinates (cleavable by, for example, ammonia or trimethylamine), quaternary ammonium salts (cleavable by, for example, diisopropylamine) and urethanes (cleavable by aqueous sodium hydroxide); acid-cleavable sites such as benzyl alcohol derivatives (cleavable using trifluoroacetic acid), teicoplanin aglycone (cleavable by trifluoroacetic acid followed by base), acetals and thioacetals (also cleavable by trifluoroacetic acid), thioethers (cleavable, for example, by HF or cresol) and sulfonyls (cleavable by trifluoromethane sulfonic acid, trifluoroacetic acid, thioanisole, or the like); nucleophile-cleavable sites such as phthalamide (cleavable by substituted hydrazines), esters (cleavable by, for example, aluminum trichloride); and Weinreb amide (cleavable by lithium aluminum hydride); and other types of chemically cleavable sites, including phosphorothioate (cleavable by silver or mercuric ions) and diisopropyl-dialkoxysilyl (cleavable by fluoride ions). Other cleavable sites will be apparent to those skilled in the art or are described in the pertinent literature and texts (e.g., Brown (1997) *Contemporary Organic Synthesis* 4(3); 216–237).

It is to be understood that while the invention has been described in conjunction with the preferred specific embodiments thereof, the foregoing description as well as the examples that follow are intended to illustrate and not limit the scope of the invention. Other aspects, advantages and modifications within the scope of the invention will be apparent to those skilled in the art to which the invention pertains.

All patents and publications mentioned herein, both supra and infra, are hereby incorporated by reference.

EXAMPLE 1

Preparation of Functionalized Surfaces

This example describes functionalization of a glass substrate with a derivatizing composition comprising 97.5 wt. % n-decyltrichlorosilane (NTS) as a first silane and 2.5 wt. % undecenyltrichlorosilane (UTS) as a second silane, followed by boration and oxidation to convert the terminal olefinic moiety of the surface-bound UTS to a hydroxyl group. This procedure is shown schematically in FIG. 1. Evaluation of the functionalized surface is also described.

(a) Silylation:

Water was dissolved into 800 ml of solvent toluene such that the concentration of water was from 100 to 500 micrograms/liter, preferably 200 to 300 micrograms/liter. Cleaned glass substrates were then placed into a ca 1 liter reactor equipped for inert gas purging and stirring. A solution of 14 ml NTS and 0.4 ml UTS in water saturated toluene was then added to the reactor. The solution was stirred at room temperature for 2 hours.

The substrates were then removed from the reactor and rinsed rigorously with an appropriate solvent. The bulk solvent was removed from the substrates by blowing with clean inert gas. The substrates were placed in a vacuum oven preheated to 150° C. and heated under vacuum for 1 hour.

(b) Boration and Oxidation:

The silyated substrates prepared in part (a) were placed in ca. 1 liter reactor equipped for inert gas purging and stirring, and purging was conducted for 30 minutes. 800 ml of a 1.0 M borane-tetrahydrofuran complex was transferred to the reactor. The substrates were incubated while stirring, for two hours. Then, the boration solution was removed and replaced with 800 ml tetrahydrofuran. The substrates were removed and rinsed rigorously with an appropriate solvent. Bulk solvent was removed by blowing with clean inert gas.

To a 1 Liter vessel equipped for stirring, 800 ml of 0.1 N NaOH in 30% hydrogen peroxide (aqueous) was added. The oxidized substrates were immersed therein, and incubated, with stirring, for 10 minutes. The substrates were removed and rinsed rigorously with an appropriate solvent, then dried by blowing with clean inert gas.

The process of steps (a) and (b) were repeated using different mole ratios of NTS and UTS, 100% UTS and a mixture of glycidoxypropyltrimethoxysilane and hexaethylene glycol (GOPS-HEG). This hydroxyl silane-linker was prepared following the procedure of Maskos et al. (Maskos et al. (1992) *Nucleic Acids Res.* 20:1679) who demonstrated it to be useful for both oligonucleotide synthesis and hybridization.

EXAMPLE 2

Figure 4:
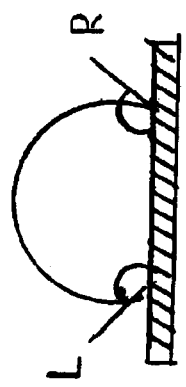
FIG. 4 illustrates a simple array to test contact angles and how the contact angle is measured.
Figure 4:
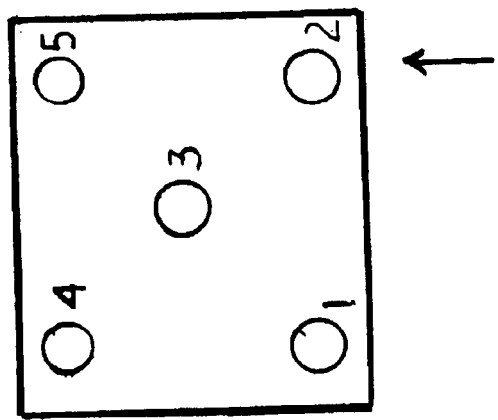

The surface hydroxyl density (molecules/$\mu m^2$) of the functionalized surfaces prepared were evaluated spectrophotometrically. FIG. 4(A) shows a scheme of the simple array that was designed to measure the contact angles of deposited solvents. FIG. 4(B) represents a droplet of solvent deposited on the surface of the array; it is taken along the arrow in 4(A) and shows how the contact angle is measured. "R" and "L" in the diagram indicate the right and left sides of the droplet of deposited solvent. The contact angle is measured on the inside of the tangent line between the droplet and the surface of the substrate. The "R" and "L" contact angles are represented by two small semicircles in FIG. 4(B). The large semicircle represents the deposited solvent. Table 1 shows the contact angles measured for the functionalized surfaces under water-saturated and anhydrous conditions. The contact angles that are reported are static contact angle measurements as described in the literature (Chan, Chi-Ming, Polymer Surface Modification and Characterization, Chapter 2 (New York: Hansa Publishers, 1993). Measurements were performed on 25 $\mu$l aliquots of the appropriate solvent using an FTA200 instrument (First Ten Angstroms, South San Francisco, Calif.). Table 1 shows the results obtained at different sites on the experimental arrays. For instance, 1L indicates the first spot left side and 1R indicates the first spot right side etc. Four sets of data and the calculated average of the results are shown. The contact angle measured for the water saturated functionalized surfaces was larger (104.48) than that measured for the anhydrous surfaces (72.57). Contact angles were measured after a 1"×1" substrate was placed in 5 mls of solution and swirled in an oven for 17 hours at 60 degrees centigrade. The stock solution that was used comprised [a] 125 mls of water, 300 mls of LiMES solution, 3.6 mls of 8 M LiCl, 3.6 mls of 5 M NaCl, 50 mls of a solution containing 15% (w/v) of Lithium Dodecyl Sulfate and a 10% (w/v) of Triton X-102 and 7 mls of EDTA solution. The Li-MES solution consisted of MES and LiOH adjusted such that the final pH of the solution used to test the substrate was 6.1.

It should be noted that if the pH of the solution was adjusted to around 7.3, the contact angle after 17 hours at 60 degrees centigrade measured for the wet process remained high (around 95 degrees), but became essentially zero for the anhydrous process. These results show the dramatically improved hydrolytic stability of the substrates using the described methodology.

TABLE 1

Evaluation of Functionalized Surfaces

Contact Angle

| Position | Case #1 (Water Saturated) | | | | Case #2 (Anhydrous) | | | |
|---|---|---|---|---|---|---|---|---|
| 1R | 106.11 | 106.2 | 104.95 | 102.71 | 71.93 | 76.91 | 70.39 | 68.58 |
| 1L | 105.71 | 106.98 | 105.16 | 102.83 | 72.13 | 73.13 | 72.2 | 66.37 |
| 2R | 105.46 | 103.15 | 103.58 | 103.33 | 72.19 | 72.88 | 76.77 | 64.74 |
| 2L | 105.3 | 102.77 | 103.73 | 103.56 | 71.13 | 75.79 | 73.3 | 60.81 |
| 3R | 105.96 | 105.04 | 103.76 | 103.2 | 78.43 | 80.94 | 79.04 | 74.21 |
| 3L | 105.78 | 104.99 | 103.78 | 102.53 | 79.29 | 76.9 | 78.66 | 72.91 |
| 4R | 103.78 | 104.05 | 104.08 | 104.37 | 71.47 | 80.29 | 66.19 | 53.48 |
| 4L | 103.29 | 103.75 | 104.35 | 104.12 | 71.07 | 77.75 | 68.28 | 53.6 |
| 5R | 105.63 | 106.3 | 104.06 | 105.16 | 76.34 | 84.32 | 61.78 | 77.44 |
| 5L | 104.55 | 105.57 | 103.84 | 105.77 | 76.14 | 78.37 | 64.2 | 75.86 |
| Average | 105.16 | 104.88 | 104.13 | 103.76 | 74.01 | 4.17 | 71.08 | 66.8 |
| Std. Dev. | 0.96 | 1.42 | 0.54 | 1.08 | 3.2 | | 6.01 | 8.71 |
| Wafer Avg. | 105.01 | | 103.93 | | 76.3 | | 68.84 | |
| Wafer Std. Dev. | 1.19 | | 0.85 | | 4.25 | | 7.61 | |
| 95% C.L. | 0.52 | | 0.37 | | 1.86 | | 3.33 | |
| Batch Average | 104.48 | | | | 72.57 | | | |
| Batch Std. Dev. | 1.16 | | | | 7.11 | | | |
| 95% C.L. | 0.36 | | | | 2.2 | | | |

I claim:

1. A process comprising:
   (a) producing a solution of an organic solvent and water;
   (b) contacting a surface of a solid substrate, which surface has reactive moieties thereon, with the solution and a derivatizing composition comprising a first silane, $R^1$—Si($R^L R^X R^Y$) and a second silane, $R^2$—(L)$_n$—Si($R^L R^X R^Y$), so that —Si—$R^1$ groups and —Si—(L)$_n$—$R^2$ groups become covalently coupled to the surface, wherein the $R^L$ moieties, which may be identical or different, are leaving groups, $R^X$ and $R^Y$ are independently lower alkyl or leaving groups, $R^1$ is a chemically inert moiety that lowers the surface energy of the substrate, n is 0 or 1, L is a linking group, and $R^2$ is either a functional group enabling covalent binding of a molecular moiety or a modifiable group that may be converted to such a functional group.

2. The process of claim 1, wherein the reactive moieties are selected from the group consisting of hydroxyl, carboxyl, thiol, amino, and combinations thereof.

3. The process of claim 2, wherein the reactive moieties are hydroxyl groups.

4. The process of claim 1, wherein the $R^L$ moieties are selected from the group consisting of halogen and alkoxy.

5. The process of claim 4, wherein the $R^L$ moieties are selected from the group consisting of chloro and lower alkoxy.

6. The process of claim 1, wherein $R^1$ is an alkyl group.

7. The process of claim 1, wherein n is 1.

8. The process of claim 7, wherein L is a $C_1$–$C_{24}$ hydrocarbylene linking group substituted with 0 to 6 substituents selected from the group consisting of lower alkyl, hydroxyl, halogen and amino, optionally containing 1 to 6 —O—, —S—, —NR—, —CONH—, —(CO)— or —COO— linkages, wherein R is hydrogen or lower alkyl.

9. The process of claim 8, wherein L is a $C_1$–$C_{24}$ alkylene.

10. The process of claim 9, wherein L is a $C_{10}$–$C_{18}$ alkylene.

11. The process of claim 1, wherein $R^2$ is —CH=CH$_2$.

12. The process of claim 1, wherein in the first silane, $R^X$ and $R^Y$ are lower alkyl.

13. The process of claim 1, wherein in the second silane, $R^X$ and $R^Y$ are lower alkyl.

14. The process of claim 1, wherein the reactive moieties are selected from the group consisting of carboxyl, thiol, amino, and combinations thereof.

15. A process for preparing a solid substrate of low surface energy and functionalized with support-bound cleavable ligands, comprising:
   (a) producing a solution of an organic solvent and water;
   (b) contacting a surface of the substrate, which surface has reactive moieties thereon, with the solution and a derivatizing composition comprising a first silane, $R^1$—Si($R^L R^X R^Y$) and a second silane, $R^2$—(L)$_n$—Si($R^L R^X R^Y$), so that —Si—$R^1$ groups and —Si—(L)$_n$—$R^2$ groups become covalently coupled to the surface, wherein the $R^L$ moieties, which may be identical or different, are leaving groups, $R^X$ and $R^Y$ are independently lower alkyl or leaving groups, $R^1$ is a chemically inert moiety that lowers the surface energy of the substrate, n is 0 or 1, L is a linking group, and $R^2$ is either a functional group or a modifiable group that may be converted to such a functional group; if $R^2$ is a modifiable group, converting it to a functional group; and (c) coupling a ligand to $R^2$ through a linking moiety containing a chemically cleavable site selected from the group consisting of base-cleavable sites, acid-cleavable sites and nucleophile-cleavable sites.

16. The process of claim 15, wherein the cleavable site is base-cleavable.

17. The process of claim 16, wherein the cleavable site is an ester linkage.

18. The process of claim 15, wherein $R^2$ is a modifiable group.

19. The process of claim 18, wherein $R^2$ is —CH=$CH_2$.

20. The process of claim 19, wherein prior to coupling the ligand, $R^2$ is converted to a hydroxyl group by boration and oxidation.

21. The process of claim 15, wherein the ligand is an intact oligomer.

22. The process of claim 21, wherein the oligomer is an oligopeptide or an oligosaccharide.

23. The process of claim 15, wherein the ligand is a first monomer to be used as the starting point for solid phase synthesis of an oligomer.

24. The process of claim 23, wherein the ligand is a nucleotide.

25. The process of claim 15, further including cleaving the ligand from the support at the cleavable site.

26. A process for synthesizing an oligomer array on a solid substrate comprising:

(a) producing a solution of an organic solvent and water;

(b) contacting a surface of the substrate, which surface has reactive moieties thereon, with the solution and a derivatizing composition comprising a first silane, $R^1$—Si($R^L R^X R^Y$) and a second silane, $R^2$—(L)$_n$—Si($R^L R^X R^Y$), so that —Si—$R^1$ groups and —Si—(L)$_n$—$R^2$ groups become covalently coupled to the surface, wherein the $R^L$ moieties, which may be identical or different, are leaving groups, $R^X$ and $R^Y$ are independently lower alkyl or leaving groups, R1 is a chemically inert moiety that lowers the surface energy of the substrate, n is 0 to 1, L is a linking group, and $R^2$ is either a functional group enabling covalent binding of a molecular moiety or a modifiable group that may be converted to such a functional group; and (c) synthesizing a plurality of substrate-bound oligomers at each $R^2$ by successively coupling monomers thereto, thereby forming an oligomer array on the functionalized surface provided in step (b).

27. The process of claim 26, wherein the individual monomers are nucleotides and the oligomers are oligonucleotides.

28. The process of claim 26, wherein the individual monomers are protected and a deprotection step is carried out after each successive coupling.

29. The process of claim 26, wherein prior to step (c) a linking group is coupled to each $R^2$, and the individual monomers are successively coupled to a free terminus of the linking group.

30. The process of claim 29, wherein the linking group contains a cleavable site.

31. The process of claim 30, wherein the cleavable site is chemically cleavable.

32. A process for preparing an oligomer array, comprising:

(a) producing a solution of an organic solvent and water;

(b) contacting a surface of a substrate, which surface has reactive moieties thereon, with the solution and a derivatizing composition comprising a first silane, $R^1$—Si($R^L R^X R^Y$) and a second silane, $R^2$—(L)$_n$—Si($R^L R^X R^Y$), so that —Si—$R^1$ groups and —Si—(L)$_n$—$R^2$ groups become covalently coupled to the surface, wherein the $R^L$ moieties, which may be identical or different, are leaving groups, $R^X$ and $R^Y$ are independently lower alkyl or leaving groups, $R^1$ is a chemically inert moiety that lowers the surface energy of the substrate, n is 0 to 1, L is a linking group, and $R^2$ is either a functional group enabling covalent binding of a molecular moiety or a modifiable group that may be converted to such a functional group; and (c) binding a plurality of substrate-bound oligomers to the functionalized substrate by coupling an oligomer to each $R^2$.

33. A process for preparing a substrate of low surface energy and functionalized with support-bound cleavable ligands, comprising:

(a) producing a solution of an organic solvent and water;

(b) contacting a surface of the substrate, which surface has reactive moieties thereon, with the solution and a derivatizing composition comprising a first silane, $R^1$—Si($R^L R^X R^Y$) and a second silane, $R^2$—(L)$_n$—Si($R^L R^X R^Y$), so that —Si—$R^1$ groups and —Si—(L)$_n$—$R^2$ groups become covalently coupled to the surface, wherein the $R^L$ moieties, which may be identical or different, are leaving groups, $R^X$ and $R^Y$ are independently lower alkyl or leaving groups, $R^1$ is a chemically inert moiety that lowers the surface energy of the substrate, n is 0 to 1, L is a linking group, and $R^2$ is either a functional group or a modifiable group that may be converted to such as functional group; if $R^2$ is a modifiable group converting it to a functional group; and (c) coupling a ligand to $R^2$ through a linking moiety containing a chemically cleavable site cleavable by an agent selected from the group consisting of lithium aluminum hydride, aluminum trichloride, silver ions, mercuric ions, and fluoride ions.

34. The process of claim 33, further including cleaving the ligand from the support at the cleavable site.

35. The process of claim 1, 15, 26, 32, or 33, wherein the contacting comprises:

(b-1) first contacting the surface with the solution;

(b-2) subsequently adding the silanes to the solution surface combination.

36. The process of claim 1, 15, 26, 32, or 33, wherein the surface of the solid support is contacted, at the same time, with the solution and the silanes.

37. The process of claim 1, 15, 26, 32, or 33, wherein $R^2$ is not a thiol.

38. A derivatizing composition for functionalizing a surface of a substrate, comprising:

a solution of an organic solvent and water and a first silane, $R^1$—Si($R^L R^X R^Y$) and second silane $R^2$—(L)$_n$—Si($R^L R^X R^Y$), wherein the $R^L$ moieties are independently leaving groups, $R^X$ and $R^Y$ may be identical or different and are either lower alkyl or leaving groups, $R^1$ is a chemically inert moiety that lowers the surface energy of the substrate, n is 0 or 1, L is a linking group, and $R^2$ is —CH=$CH_2$.

* * * * *